(12) United States Patent
Poulain et al.

(10) Patent No.: US 11,130,328 B2
(45) Date of Patent: Sep. 28, 2021

(54) MULTI-LAYER DEVICE ASSEMBLY SYSTEM

(71) Applicant: Preco, Inc., Lenexa, KS (US)

(72) Inventors: Dana Poulain, Lenexa, KS (US); Ted A. Teuscher, Lenexa, KS (US)

(73) Assignee: Preco, Inc., Lenexa, KS (US)

( * ) Notice: Subject to any disclaimer, the term of this patent is extended or adjusted under 35 U.S.C. 154(b) by 308 days.

(21) Appl. No.: 16/354,712

(22) Filed: Mar. 15, 2019

(65) Prior Publication Data

US 2019/0283390 A1    Sep. 19, 2019

Related U.S. Application Data

(60) Provisional application No. 62/644,809, filed on Mar. 19, 2018.

(51) Int. Cl.
| | |
|---|---|
| *B32B 41/00* | (2006.01) |
| *G06T 7/00* | (2017.01) |
| *H04N 5/247* | (2006.01) |
| *B32B 37/18* | (2006.01) |
| *H04N 5/232* | (2006.01) |

(52) U.S. Cl.
CPC ............. *B32B 41/00* (2013.01); *B32B 37/18* (2013.01); *G06T 7/0004* (2013.01); *H04N 5/23203* (2013.01); *H04N 5/247* (2013.01); *G06T 2207/30108* (2013.01)

(58) Field of Classification Search
CPC ... B32B 41/00; B32B 37/18; B32B 2457/208; B32B 27/08; B32B 2307/558; B32B 27/283; B32B 29/005; B32B 15/12; B32B 3/20; B32B 7/12; B32B 15/08; B32B 3/266; B32B 27/10; B32B 2307/546; B32B 37/20; B32B 37/12; B32B 2535/00; B32B 37/02; B32B 38/10; G06T 7/0004; G06T 2207/30108; H04N 5/247; H04N 5/23203; B01L 2300/0816; B01L 2300/0874; B01L 2300/0887; B01L 3/502707

USPC .... 156/60, 64, 350, 351, 378, 379; 428/34.6
See application file for complete search history.

(56) References Cited

U.S. PATENT DOCUMENTS

| | | | | |
|---|---|---|---|---|
| 6,425,477 B1 * | 7/2002 | Karasawa | ......... | H01L 21/67715 198/465.2 |
| 2003/0149505 A1 * | 8/2003 | Mogensen | ........... | H05K 3/1275 700/117 |
| 2016/0014909 A1 * | 1/2016 | Faraci | ..................... | H05K 3/00 156/64 |

* cited by examiner

*Primary Examiner* — Michael N Orlando
*Assistant Examiner* — Joshel Rivera
(74) *Attorney, Agent, or Firm* — Hovey Williams LLP

(57) ABSTRACT

A multi-layer device assembly system including a substrate source, a plurality of dispenser modules, a feeder, a control system having a number of alignment cameras corresponding to the dispenser modules, an inspection camera, and a defect camera. The substrate source provides a substrate having a plurality of base elements. Each dispenser module includes an actuation mechanism configured to laminate a layer element onto one of the base elements or onto a previously laminated layer element. The feeder metes out the substrate from the substrate source to advance each base to a subsequent dispenser module between lamination steps. The control system determines alignments, defects, and lamination errors via the alignment cameras, inspection camera, and defect camera.

16 Claims, 6 Drawing Sheets

MULTI-LAYER DEVICE ASSEMBLY SYSTEM

RELATED APPLICATIONS

This non-provisional patent application claims priority benefit with regard to all common subject matter of earlier-filed U.S. Provisional Patent Application Ser. No. 62/644,809, titled "FLEXTRACKER SYSTEM MULTILAYER DEVICE ASSEMBLY AND LAMINATION", filed Mar. 19, 2018. The earlier-filed application is hereby incorporated by reference in its entirety into the present application.

BACKGROUND

Multi-layer microfluidic devices are often used to perform rapid medical diagnostic tests and food safety tests. Other multi-layer devices may be components of electronic displays, touch-screens, and membrane switches for small electronic devices such as smartphones, activity trackers, and portable medical devices.

Multi-layer microfluidic devices can be produced with low-cost polymer films and adhesives by creating layers with intralayer channels for carrying fluids, interlayer vias (i.e., through-holes) for allowing fluids to pass between layers, and reservoirs in which liquid or solid reagents may be placed during assembly. The layers are typically assembled via an assembler having a robotic actuator configured to handle only one or two layer placements at a time. Additional layers require two or more passes through the assembler.

Multi-layer microfluidic devices are typically inspected for tolerance and defects after assembly is completed, which often results in wasted material and assembly cycles. Inspection is often limited to exteriors of completed assemblies, which may overlook internal misalignment and internal defects. Furthermore, conventional inspection systems typically focus only on portions of completed assemblies. Additional inspection requires reconfiguration or new setups.

SUMMARY

Embodiments of the present invention solve the above-mentioned problems and other problems by providing a multi-layer device assembly system having increased production capacity, increased operational reliability, and improved production quality.

An embodiment of the multi-layer device assembly system broadly comprises an unwind spindle, a first web guide, a first clamp, a splice, a plurality of vacuum plates, a plurality of static controls, a plurality of dispenser modules, a press, a hitch feed, a second clamp, a second web guide, a rewind spindle, and a control system including a plurality of cameras.

The unwind spindle is positioned near a first side of the multi-layer device assembly system and supplies a substrate in a feed direction (i.e., toward a first dispenser module). The unwind spindle may be servo-powered and maintains a specified web tension.

The first web guide is positioned near the unwind spindle for adjusting the unwind spindle and/or the substrate to maintain an edge of the substrate at a constant location near the first clamp. The first web guide may be an actuator, a biased member, or any other suitable guide.

The first clamp is positioned near the unwind spindle for securing the substrate in a lamination area. The first clamp ensures that the substrate cannot advance during application or lamination steps.

The splice is positioned near the first clamp and connects a terminal end of a reel of substrate material with the beginning of another reel of substrate material. In this way, assembly can continue during reel changeovers. Splicing also creates larger output rolls of finished parts.

The vacuum plates are positioned below the dispenser modules in the lamination area and stabilize the substrate material at a number of assembly stations and a press station. The vacuum plates maximize accuracy and minimize bubbles and other defects.

The static controls are positioned between the assembly stations. The static controls mitigate static electricity buildup as the substrate is advanced between assembly stations.

The dispenser modules are positioned along the feed direction over assembly stations in the lamination area for applying layers to the base or to previously applied layers. The dispenser modules are substantially identical so only the first dispenser module will be described. The first dispenser module broadly comprises an element supply spool, a liner stripping plate, an end effector, a first take-up spool, and a second take-up spool.

The element supply spool provides elements from a support web or liner serving as a carrier. Alternatively, elements may be supplied via a magazine stack or other suitable arrangement.

The liner stripping plate is positioned adjacent the first vacuum plate. The liner stripping plate receives an element for removing top and/or bottom liners and/or interleaf material therefrom.

The end effector includes motors, pneumatics, hydraulics or the like for engaging, retaining, adjusting or realigning, and moving elements. The end effector moves between the liner stripping plate and the vacuum plate via a rail, gantry, or other suitable mechanism.

The first take-up spool receives removed liners and/or interleaf materials. The second take-up spool receives removed top liners and/or interleaf materials.

The press is positioned after the last (e.g., the fourth) dispenser module or after any of the other dispenser modules. The press may be pneumatic or hydraulic.

The hitch feed is positioned after the press and metes out the substrate from the unwind spindle. The hitch feed also advances the substrate between assembly stations. The hitch feed may be a linear actuator, a servo-driven vacuum conveyer, or any other suitable feeder or advancement mechanism.

The second clamp is positioned near the rewind spindle and secures the substrate along with the first clamp. The second clamp may be servo-powered and ensures that the substrate cannot advance during application or lamination steps.

The second web guide is positioned near the second clamp and maintains an edge of the substrate at a constant location near the second clamp. The second web guide may be an actuator, a biased member, or any other suitable guide.

The rewind spindle is positioned near a second side of the enclosure and collects the substrate (and completed multi-layered devices in some embodiments) after assembly. The rewind spindle may be servo-powered and maintains a specified web tension.

The control system includes a master computer, a secondary vision computer, a number of vision controllers, a number of alignment cameras (one set for each dispenser module), and optionally a layer inspection camera, and/or a defect inspection camera.

The master computer includes a touchscreen human-machine interface (HMI), a processor, a memory, and/or other suitable computer components. The master computer handles motion controls, primary I/O, and safety control, and collects and analyzes position corrections and inspection results from the vision controllers.

The secondary vision computer is communicatively connected to the vision controllers for programming the vision controllers and displaying vision results. The secondary vision computer may include a processor, a memory, and/or other suitable computer components.

The vision controllers are communicatively connected to the master computer and the secondary vision computer and are substantially identical so only a first vision controller will be described. The first vision controller controls the first set of alignment cameras corresponding to the first dispenser module. The first vision controller is modular such that additional vision cameras can be added for more alignment or inspection capability.

Each set of alignment cameras are communicatively connected to one of the vision controllers and are substantially identical so only the first set of alignment cameras (including three alignment cameras) will be described. The first alignment camera is positioned above the liner stripping plate for viewing a workpiece's cursory position. The second alignment camera is positioned below the liner stripping plate for viewing fiducial locations on the stripped and exposed workpiece. The third alignment camera is positioned above the first vacuum plate for viewing the workpiece on the substrate so that the workpiece may be adjusted to be in registration alignment to the base layer or previous layer. Each alignment camera may be a high resolution, 21 megapixel camera having a large field of view.

The layer inspection camera is positioned close to the lamination area near one of the assembly stations. The layer inspection camera confirms layer placement and alignment. The layer inspection camera may be a high resolution, 21 megapixel camera having a large field of view.

The defect inspection camera is positioned close to the lamination area near the press. The defect inspection camera has a view of the multi-layer device after most or all of the layers have been added, and optionally after some or all post-assembly steps, such as compression, have been performed. The defect inspection camera may be a high resolution, 21 megapixel camera having a large field of view.

The dispenser modules and the press station are operated simultaneously such that several multi-layer devices are being assembled at any one time. For example, the press station may be compressing a completed multi-layer device at the press station while each dispenser module adds a layer to a base or a previous layer of another multi-layer device in progress. The multi-layer devices (in their various states of assembly) may be advanced simultaneously by the hitch feed in between assembly steps.

The summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
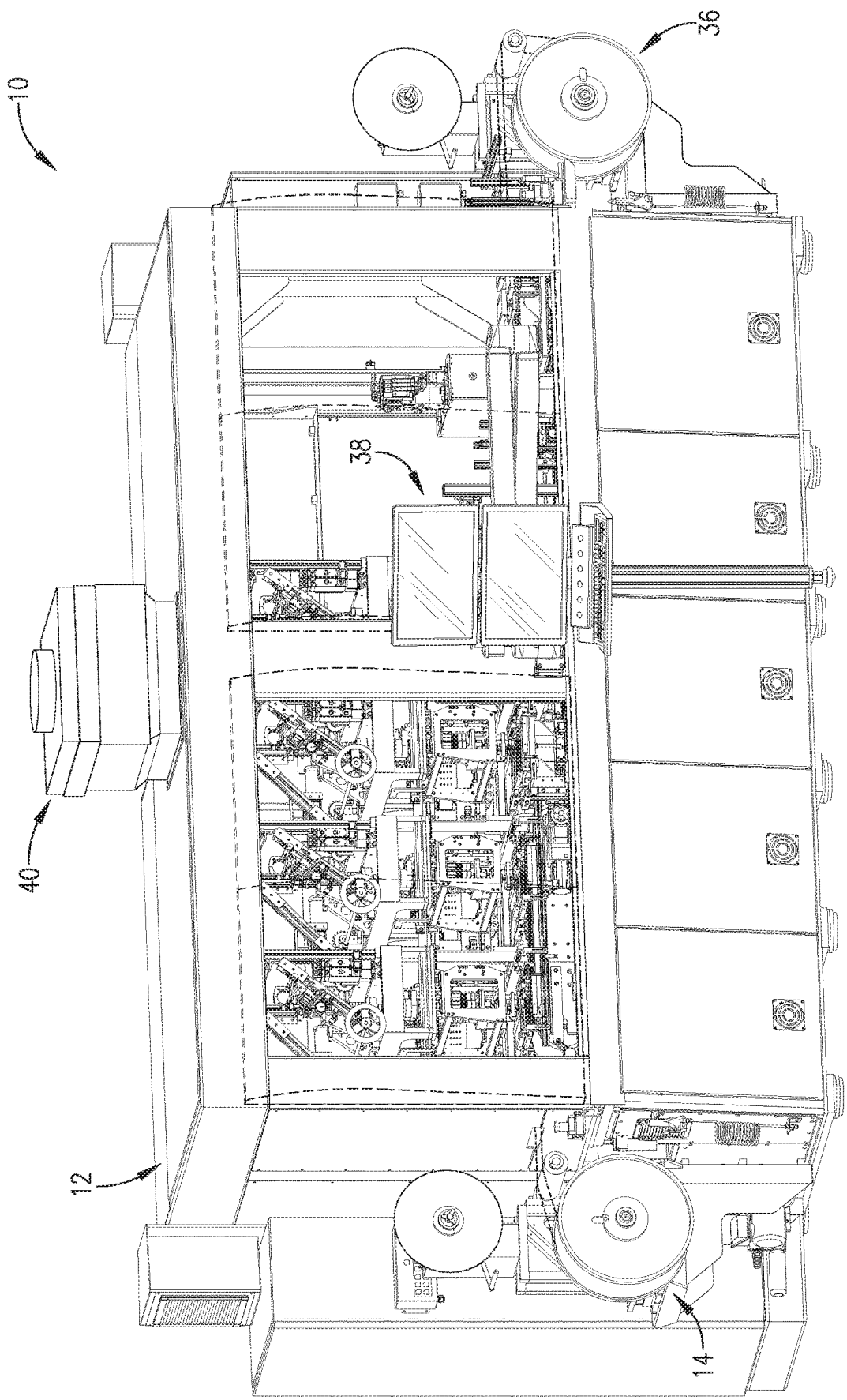
FIG. 1 is a perspective view of a multi-layer device assembly system constructed in accordance with an embodiment of the invention.
Figure 2:
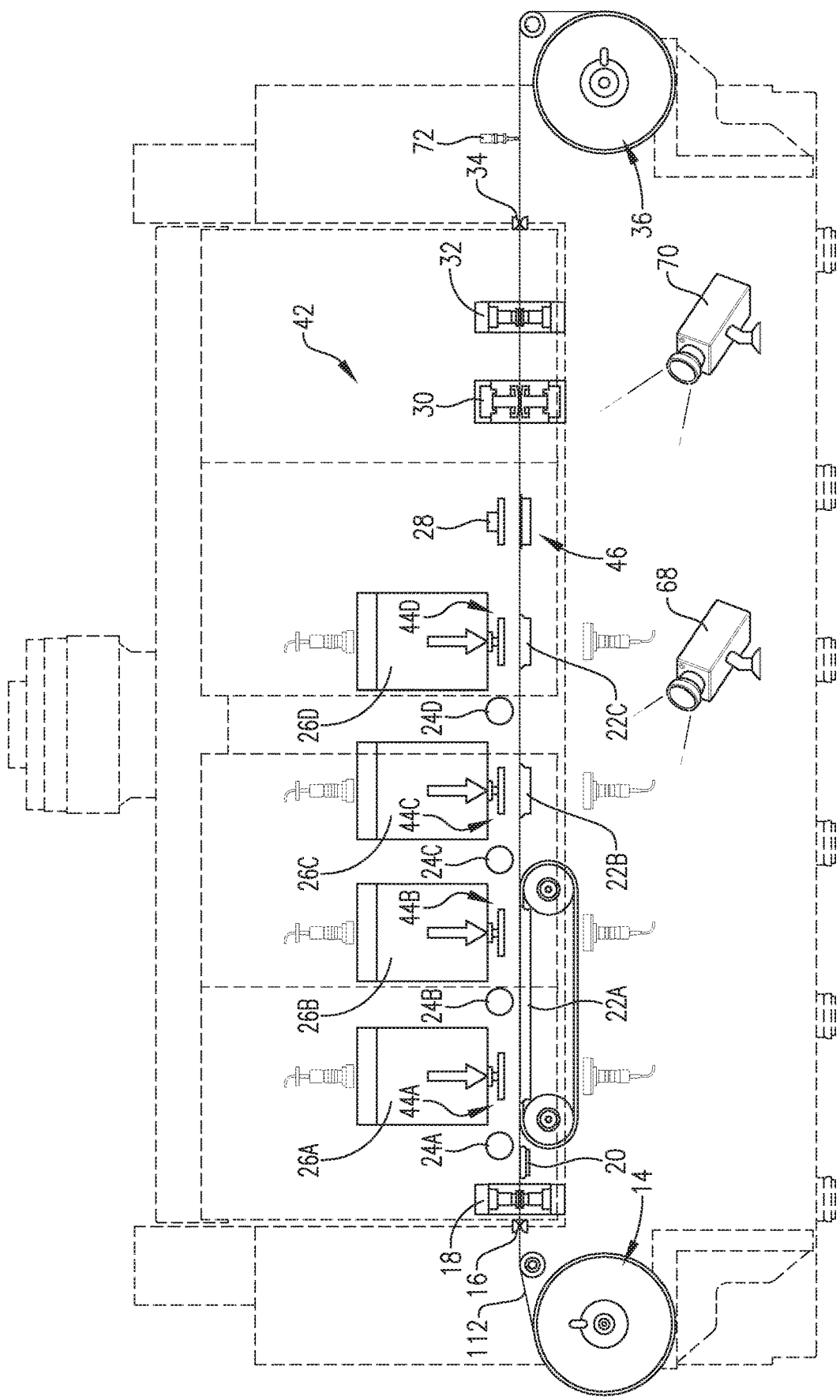
FIG. 2 is a schematic diagram of the multi-layer device assembly system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and FIGS. 1-4 in particular, a multi-layer device assembly system 10 (hereinafter "assembly system 10") constructed in accordance with embodiments of the invention is illustrated. The assembly system 10 may be used for assembling and inspecting a multi-layered microfluidic device 100 (FIG. 5) or other multi-layered devices. The assembly system 10 broadly comprises an enclosure 12, an unwind spindle 14, a first web guide 16, a first clamp 18, a splice 20, a plurality of vacuum plates 22A-C, a plurality of static controls 24A-D, a plurality of dispenser modules 26A-D, a press 28, a hitch feed 30, a second clamp 32, a second web guide 34, a rewind spindle 36, and a control system 38 including a plurality of cameras and sensors.

The multi-layered device 100 includes several layers comprising elements 102, 104, 106, 108, 110 stacked on top of each other via the multi-layer device 10, and adhesives for holding the layers together. The bottom layer (layer 102)

may be a base formed from a substrate 112. The substrate 112 may be a plain carrier film web or may include device components or features.

Layer 102 and each subsequent layer (layers 104-110) may include several device components or features such as fluid channels 114, vias 116 (i.e., through-holes), reservoirs 118, chambers, notches, fiducials 120 or other alignment features and may be formed of a polymer film. The device components or features may be etched or cut into each layer 102-110 and are configured to hold liquid or solid reagents or other materials. The multi-layer device 100 may be a microfluidic device such as a Lab-on-a-Chip (LOAC) for performing food safety tests and rapid medical diagnostic tests such as blood analysis and anti-bodies detection, a touch-screen or other electronic display component, a membrane switch for small electronic devices such as smartphones, activity trackers, and portable medical devices, or any other suitable device.

Layer materials may include polydimethylsiloxane (PDMS), glass, flexible polymer films, paper, thermoset or thermoform plastics, and metals including circuit layers. Glass is desirable for its mechanical and chemical stability, but because of fabrication challenges, low impact resistance, and higher cost, it may not be suitable for mass production in some instances. PDMS may be used in rapid prototyping and is good for exploratory stages of research, but generally may not be suitable for mass production. PDMS also has a low modulus of elasticity, which may result in changes in channel geometry. Adhesives may include pressure-sensitive adhesives (PSAs) or any other suitable adhesives.

The enclosure 12 may include a filter 40 and houses the dispenser modules 26A-D. The filter 40 ensures air entering the enclosure 12 is free of particulate contamination. The filter 40 may be a high efficiency particulate air (HEPA) filter or any other suitable filtering mechanism.

The unwind spindle 14 may be positioned near a first side of the enclosure 12 and supplies the substrate 112 in a feed direction (i.e., into the enclosure toward the dispenser module 26A). The unwind spindle 14 may be servo-powered and maintains a specified web tension. Any other suitable substrate source may also be used.

The first web guide 16 may be positioned near the unwind spindle 14 for adjusting the unwind spindle 14 and/or the substrate 112 to maintain an edge of the substrate 112 at a constant location near the first clamp 18. The first web guide 16 may be an actuator, a biased member, or any other suitable guide.

The first clamp 18 may be positioned near the unwind spindle 14 for securing the substrate 112 near a first end of a lamination area 42. The first clamp 18 may be pneumatic or servo-powered and ensures that the substrate 112 cannot advance during application or lamination steps.

The splice 20 may be positioned near the first clamp 18 for connecting a terminal end of a reel of substrate material with the beginning of another reel of substrate material. In this way, assembly can continue during reel changeovers.

The vacuum plates 22A-C may be positioned below the dispenser modules 26A-D in the lamination area 42 and stabilize the substrate material at a number of assembly stations 44A-D and a press station 46. The vacuum plates 22A-C maximize lamination accuracy and minimize bubbles and other defects.

The static controls 24A-D may be positioned between the assembly stations 44A-D. The static controls 24A-D mitigate static electricity buildup as the substrate 112 is advanced between assembly stations.

Figure 3:
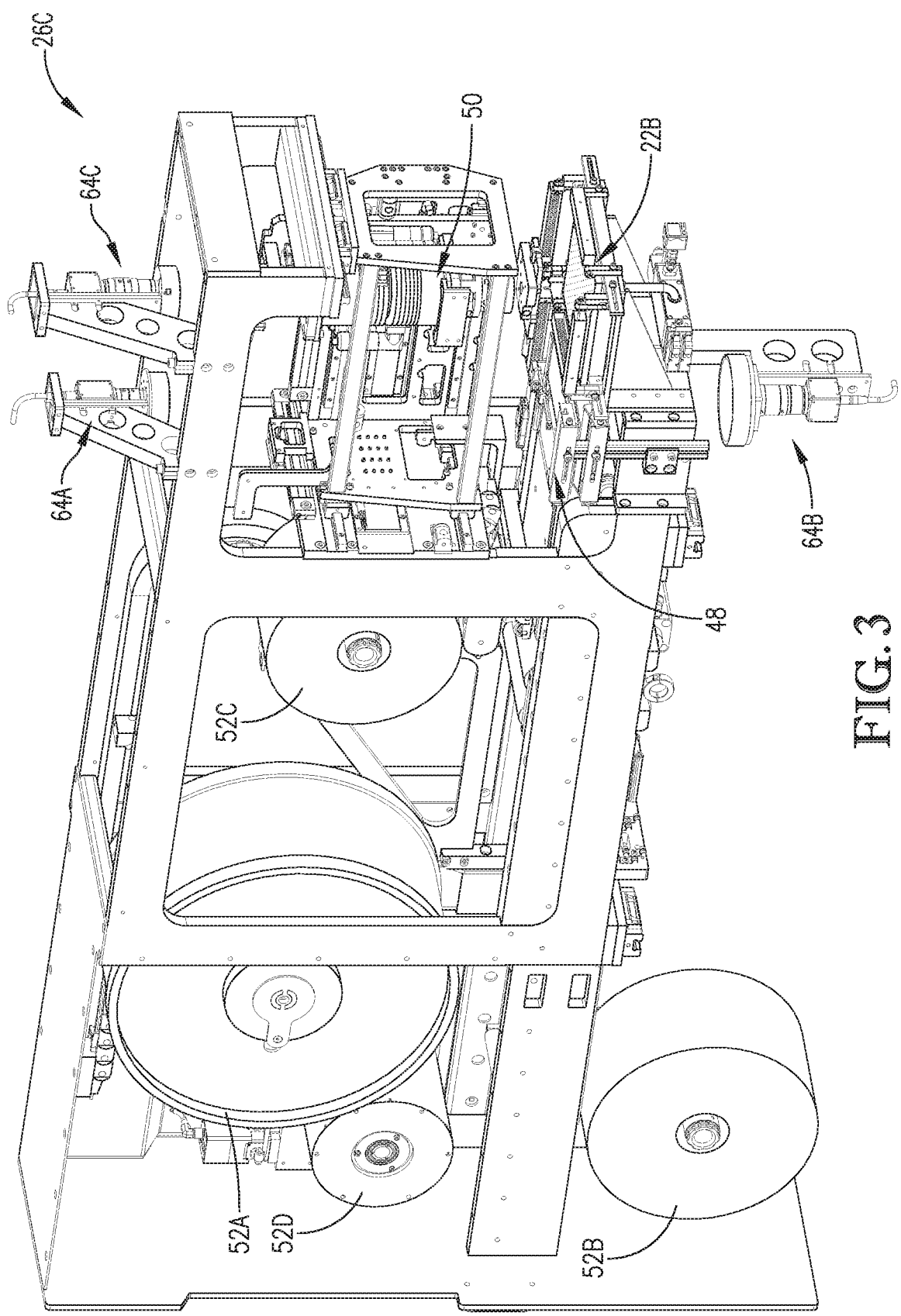
FIG. 3 is a perspective view of a dispenser module of the multi-layer assembly system of FIG. 1.

The dispenser modules 26A-D may be positioned along the feed direction at distinct progression distances for applying layers to the base 102 or to previously applied layers. The dispenser modules 26A-D are substantially identical so only dispenser module 26C will be described. As best seen in FIG. 3, dispenser module 26C broadly comprises a liner stripping plate 48, an end effector 50, an element supply spool 52A, a first take-up spool 52B, a second take-up spool 52C, and a dancer 52D.

The liner stripping plate 48 may be positioned adjacent the vacuum plate 22B. The liner stripping plate 48 receives an element for removing top and/or bottom liners and/or interleaf material therefrom.

The end effector 50 includes motors, pneumatics, hydraulics or the like for engaging, retaining, adjusting or realigning, and moving elements. The end effector 50 moves between the liner stripping plate 48 and the vacuum plate 22B via a rail, gantry, or other suitable mechanism.

The element supply spool 52A provides elements from a support web or liner serving as a carrier. Alternatively, elements may be supplied via a magazine stack or other suitable arrangement.

The first take-up spool 52B receives removed bottom liners. Meanwhile, the second take-up spool 52C receives removed top liners and/or interleaf materials. The dancer 52D maintains a specified tension on the element supply spool 52A.

The press 28 may be positioned after dispenser module 26D (or any of the other dispenser modules) and may include an appropriate (e.g., medium) durometer urethane rubber upper platen for compressing each multi-layered device. The press 28 may be pneumatic or hydraulic. A pneumatic press may provide approximately 290 kgf (600 lbf), while a hydraulic press may supply much higher forces.

The hitch feed 30 may be positioned after the press 28 and metes out the substrate 112 from the unwind spindle 14. The hitch feed 30 also advances the substrate 112 between assembly stations. The hitch feed 30 may be a linear actuator, a servo-driven vacuum conveyer, or any other suitable feeder or advancement mechanism.

The second clamp 32 may be positioned near the rewind spindle 36 for securing the substrate 112 near a second end of the lamination area 42. The second clamp 32 may be pneumatic or servo-powered and ensures that the substrate 112 cannot advance during application or lamination steps.

The second web guide 34 may be positioned near the second clamp 32 for adjusting the hitch feed 30, the rewind spindle 36 and/or the substrate 112 to maintain an edge of the substrate 112 at a constant location near the second clamp 32. The second web guide 34 may be an actuator, a biased member, or any other suitable guide. The second web guide compensates for possible camber or bowing of the substrate 112.

The rewind spindle 36 may be positioned near a second side of the enclosure 12 and collects the substrate 112 (and completed multi-layered devices in some embodiments) after assembly. The rewind spindle 36 may be servo-powered and maintains a specified web tension. Any other suitable substrate collector may also be used.

Figure 4:
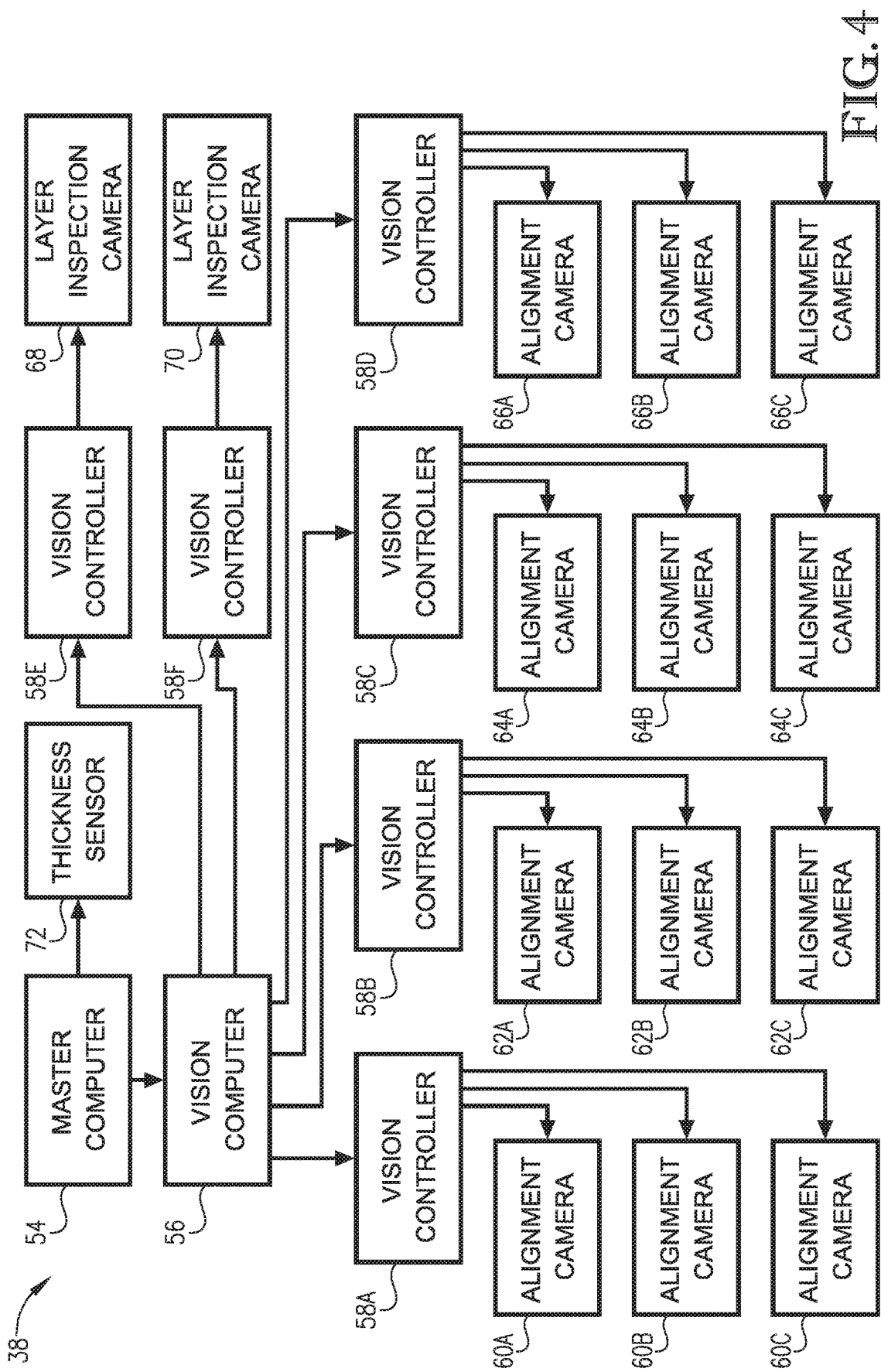
FIG. 4 is a schematic diagram of a control system of the multi-layer assembly system of FIG. 1.
Figure 5:
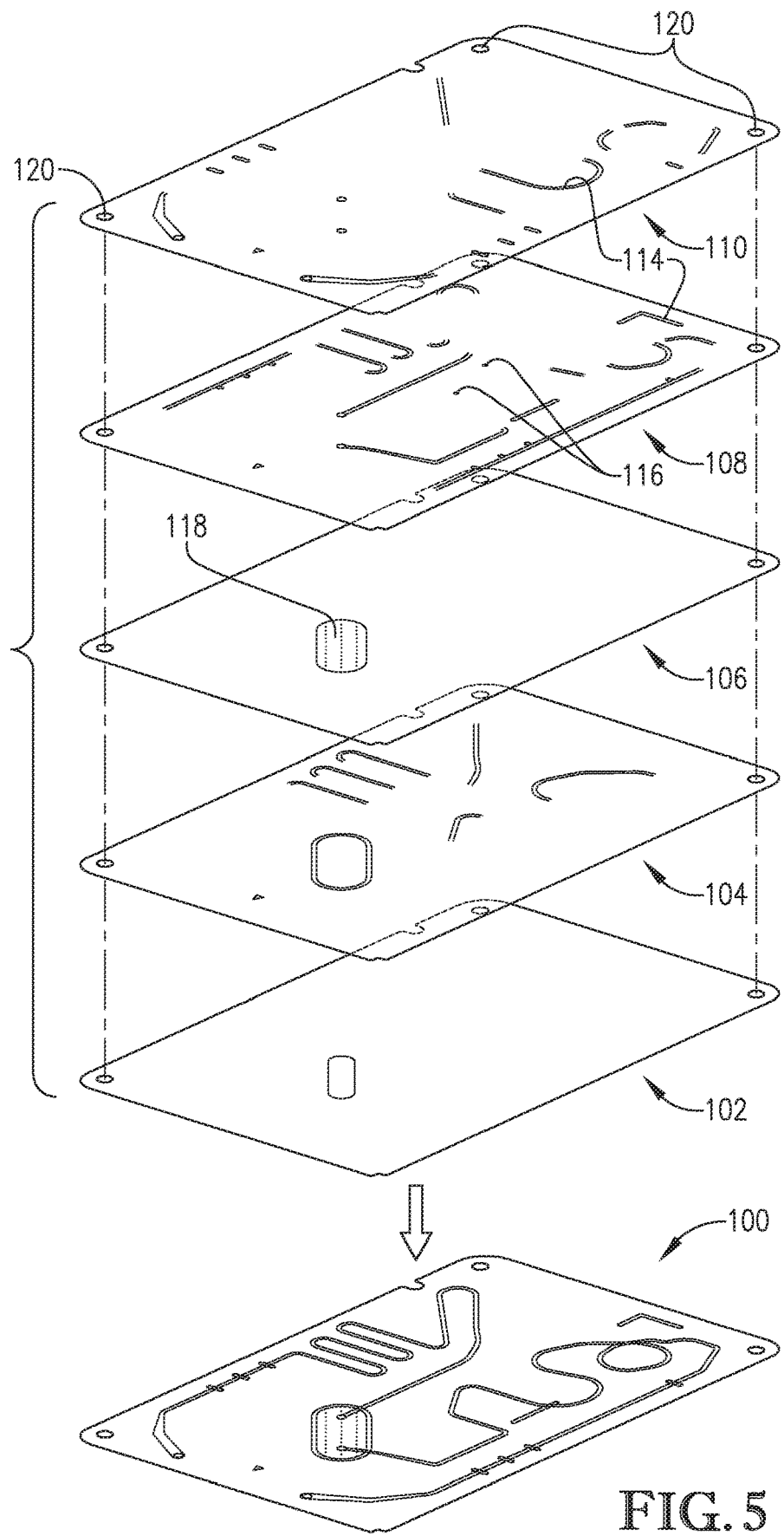
FIG. 5 is an exploded perspective view of a multi-layer device constructed in accordance with an embodiment of the invention.

Turning to FIG. 4, the control system 38 includes a master computer 54, a secondary vision computer 56, a number of vision controllers 58A-F, a number of alignment cameras 60A-C, 62A-C, 64A-C, 66A-C, a layer inspection camera 68, a defect inspection camera 70, and a thickness sensor 72.

Certain embodiments of the control system 38 may implement logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, processing elements may comprise dedicated circuitry or logic that is permanently configured, such as an application-specific integrated circuit (ASIC), or indefinitely configured, such as an FPGA, to perform certain operations. Processing elements may also comprise programmable logic or circuitry (e.g., as encompassed within a general-purpose processor or other programmable processor) that is temporarily configured by software to perform certain operations. The decision to implement processing elements as special purpose, in dedicated and permanently configured circuitry, or as general purpose (e.g., configured by software) may be driven by cost and time considerations.

Accordingly, the term "processing element" or equivalents encompass a tangible entity that is physically constructed, permanently configured (e.g., hardwired), or temporarily configured (e.g., programmed) to operate in a certain manner or to perform certain operations described herein. Considering embodiments in which the processing element is temporarily configured, each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmissions (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further hardware component may later access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, processes, methods, or routines described herein may be at least partially processing element-implemented. For example, at least some of the operations of a method may be performed by one or more processing elements or processing element-implemented hardware modules. The performance of certain operations may be distributed among the one or more processing elements, not only residing within a single machine, but deployed across a number of machines. In some example embodiments, the processing elements may be located in a single locale (e.g., within an office environment or as a server farm), while in other embodiments the processing elements may be distributed across a number of locations.

Unless specifically stated otherwise, discussions herein using words such as "processing", "computing", "calculating", "determining", "presenting", "displaying", or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The master computer 54 includes a touchscreen human-machine interface (HMI), a processor, a memory, and/or other suitable computer components. The master computer 54 handles motion controls, primary I/O, and safety control, and collects and analyzes position corrections and inspection results from the vision controllers 58A-F.

The secondary vision computer 56 is communicatively connected to the master computer 54 and the vision controllers 58A-G and is used to program the vision controllers 58A-F and to visually display camera images and inspection results. The secondary vision computer 56 may include a processor, a memory, and/or other suitable computer components.

The vision controllers 58A-F are communicatively connected to the secondary vision computer 56 and are substantially identical so only vision controller 58A will be described. Vision controller 58A controls alignment cameras 60A-C in the dispenser module 26A. The vision controller 58A is modular such that additional vision cameras can be added for more alignment or inspection capability.

Each set of alignment cameras 60A-C, 62A-C, 64A-C, and 66A-C are communicatively connected to one of the vision controllers 58A-F and are substantially identical so only alignment cameras 64A-C corresponding to dispenser module 26C will be described. Alignment camera 64A may be positioned above the liner stripping plate 48 for viewing a workpiece's cursory position for rough alignment of end effector 50 to the workpiece. Alignment camera 64A may be a high resolution, 5-21 megapixel camera having a large field of view.

Alignment camera 64B may be positioned below the liner stripping plate 48 for viewing fiducial locations on the stripped and exposed workpiece relative to the current position of end effector 50. Alignment camera 64B may be a high resolution, 5-21 megapixel camera having a large field of view.

Alignment camera 64C may be positioned above the first vacuum plate 22A for viewing the workpiece on the substrate 112 so that the workpiece may be adjusted to be in registration alignment to the base layer or previous layer. Alignment camera 64C may be a high resolution, 21 megapixel camera having a large field of view.

The layer inspection camera 68 may be positioned close to the lamination area 42 near one of the assembly stations 44A-D such as between assembly stations 44A and assembly station 44B. The layer inspection camera 68 confirms layer placement and alignment. Layer inspection camera 68 may be a high resolution, 5-21 megapixel camera having a large field of view.

The defect inspection camera 70 may be positioned close to the lamination area 42 near the press 28. The defect inspection camera 70 has a view of the multi-layer device 100 after most or all of the layers have been added, and optionally after some or all post-assembly steps, such as compression, have been performed. The defect inspection camera 70 may be a high resolution, 21 megapixel camera having a large field of view.

The thickness sensor 72 may be positioned near the press 28 for sensing a height or thickness of the multi-layer device 100 after compression. The thickness sensor 72 may be a camera, a light sensor, an ultrasonic sensor, or any other suitable sensor.

Figure 6:
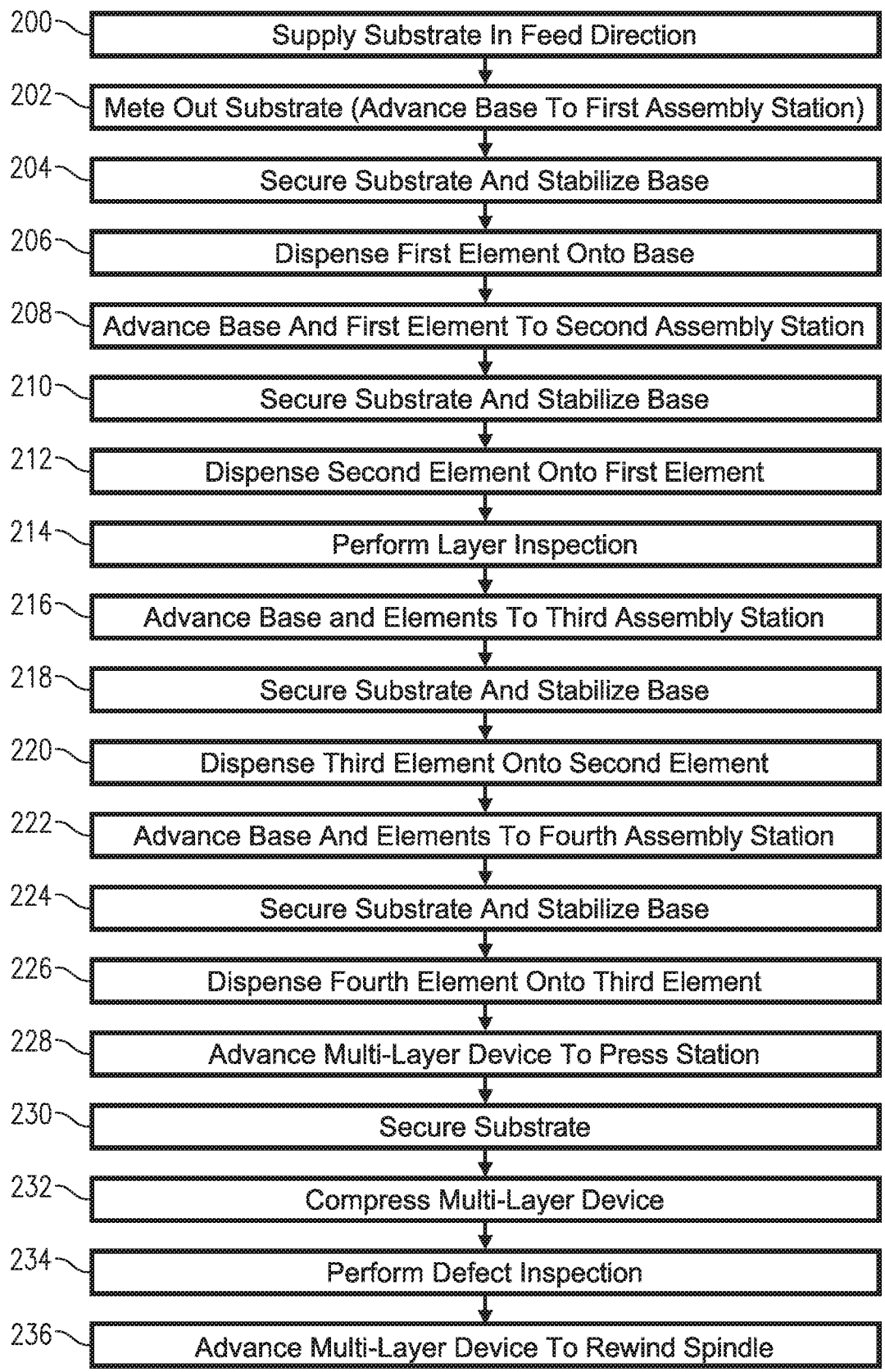
FIG. 6 is a flow diagram of method steps of assembling a multi-layer device assembly system in accordance with an embodiment of the invention.

Use of the assembly system 10 will now be described in detail, with reference to FIG. 6. First, the substrate 112 may be supplied in a feed direction from the unwind spindle 14 to the rewind spindle 36, as shown in block 200. The hitch feed 30 metes out the substrate 112 so as to advance the first base 102 to the first assembly station 44A corresponding to the first dispenser module 26A, as shown in block 202. The first web guide 16 and the second web guide 34 maintain cross-web alignment of the substrate 112 as the substrate 112 is advanced.

The first clamp 18 and the second clamp 32 then secure the substrate 112, as shown in block 204. The first vacuum plate 22A also stabilizes the first base 102 at the first assembly station. This maximizes deposition accuracy and minimizes bubbles and other defects. Meanwhile, the hitch feed 30 retracts in preparation for another advance.

The first dispenser module 26A may then dispense the first element 104 onto the first base, as shown in block 206. Specifically, the first dispenser module 26A obtains the first element 104 from a support web or liner serving as a carrier and deposits the first element on its liner stripping plate and alignment camera 60A views the first element's cursory position whereby the position of the end effector 50 is adjusted. The end effector 50 of the first dispenser module 26A secures the first element 104 prior to liner removal. The end effector holds the first element 104 as the liner stripping plate retracts such that the liner is pulled away to a frame-mounted take-up spool. The second take-up spool may be used to remove either a top liner or an interleaf material.

Alignment camera 60B captures fiducial locations on the stripped and exposed first element 104 now attached to the end effector 50. The alignment camera 60C views the first element's alignment relative to the first base 102. The end effector then advances the first element 104 toward the first assembly station 44A above vacuum plate 22A and rotates the first element 104 to align with the first base 102. The end effector adjusts the first element 104 via translation in "x" and "y" directions and/or rotation about a theta axis so as to be in precise registration alignment with the first base 102. The end effector then presses the first element 104 onto the first base 102 and releases from the first element 104.

The hitch feed 30 then advances the first base 102 to the second assembly station 44B corresponding to the second dispenser module 26B by meting out the substrate 112 in the feed direction, as shown in block 208.

The first clamp 18 and the second clamp 32 then secure the substrate 112, as shown in block 210. The first vacuum plate 22A also stabilizes the first base 102 at the second assembly station. Meanwhile, the hitch feed 30 retracts in preparation for another advance.

The second dispenser module 26B then dispenses the second element 106 onto the first element base, as shown in block 212. The second element 106 may be dispensed in the same way as described above and thus will not be described further.

The layer inspection camera 68 then views the first base 102 the first element 104, and the second element, as shown in block 214. Inspection may include at least one of 1) card/layer misalignment, 2) component position and absence/presence, 3) general vision inspection, 4) stack height, and 5) defect marking.

For card/layer misalignment, the layer inspection camera 68 may view the placement of registration features relative to each other for alignment verification after lamination of a layer. The control system 38 may generate an alert or notify the operator of the condition and await input. Alternatively, the control system 38 may log the location of fiducials after lamination to a data file for off-line analysis.

Regarding component position and absence/presence, components smaller than a multi-layer device may be inserted into a layer. Components may include a valve, a barrier piece, or the like. Such components may be relatively small and more challenging to handle and place. The control system 38 may confirm the presence of the components after placement and assess their position. The control system 38 may log the location of fiducials after lamination to a data file for off-line analysis.

A wide variety of general vision inspections may be specified and performed to identify the presence of defects such as particulates and bubbles of size 0.13 mm (0.005") diameter or larger. Other inspections may detect fibers. Contaminants having certain characteristics (e.g., clear or opaque, color, or surface finish) may require specific vision and lighting tests to validate their presence.

Stack height or stack thickness may be measured to verify the presence of all layers (i.e., no missing elements or extra elements). Limits for a stack height test may be a maximum height of 5 mm (0.197") and a resolution of plus or minus 0.005 mm (plus or minus 0.0002").

Defect marking may be used when a defective lamination is detected via lamination verification. The assembly system 10 may mark the defective part by punching a hole in the multi-layer device 100, or via inkjet marking or laser marking.

Different features and feature locations can be used in inspection modes, fiducial mark verification modes, and the like without changing camera location or calibration. Geometric pattern matching may also be used to allow for slight overlap of concentric circles/features in registration and verification. Camera illumination, including direction and light intensity, can be adjusted via the control system 38 to optimize feature recognition.

Additional layer inspection cameras may be used after any suitable step. In one embodiment, an inspection layer camera is used after each lamination step.

The hitch feed 30 may then advance the first base 102, the first element 104, and the second element 106 to the third assembly station 44C corresponding to the third dispenser module 26C, as shown in block 216. An integer number of progressions may be required to move an element from one stage to the next stage.

The first clamp 18 and the second clamp 32 then secure the substrate 112, as shown in block 218. The second vacuum plate 22B also stabilizes the first base 102 at the third assembly station. Meanwhile, the hitch feed 30 retracts in preparation for another advance.

The third element 108 may be dispensed onto the second element 106, as shown in block 220, in the same way as described above and thus will not be described further.

The hitch feed 30 may then advance the first base 102, the first element 104 the second element 106, and the third element 108 to the fourth assembly station 44D corresponding to the fourth dispenser module 26D, as shown in block 222.

The first clamp 18 and the second clamp 32 then secure the substrate 112, as shown in block 224. The third vacuum plate 22C also stabilizes the first base 102 at the fourth assembly station. Meanwhile, the hitch feed 30 retracts in preparation for another advance.

The fourth element 110 may be dispensed onto the third element 108 in the same way as described above, as shown in block 226, and thus will not be described further. The multi-layer device 100 is thus formed once all of the elements are dispensed in succession.

The hitch feed 30 may then advance the multi-layer device 100 to the press station corresponding to the press 28, as shown in block 228. The first clamp 18 and the second clamp 32 then secure the substrate 112, as shown in block 230. The press 28 compresses the multi-layer device 100 on the substrate 112 to a prescribed pressure, as shown in block 232.

Meanwhile, the defect inspection camera 70 views the multi-layer device 100 after compression, as shown in block 234. Defect inspection may include at least one of 1) card/layer misalignment, 2) component position and absence/presence, 3) general vision inspection, 4) stack height, and 5) defect marking as described above. Defect inspection via the defect inspection camera 70 thus will not be described further.

The hitch feed 30 may then advance the multi-layer device 100 out of the enclosure 12 to the rewind spindle 36, as shown in block 236. That is, the multi-layer device 100 remains on the substrate 112 and wound into a roll format. Alternatively, the multi-layer device 100 may be removed from the substrate 112 via a removal module for a downstream process such as sterilization, chemical or reagent dosing, packaging, or the like.

Additional multi-layer devices may be assembled in progression such that several multi-layer devices are being assembled at any one time. For example, the press station 46 may compress the multi-layer device 100 at the press station 46, the dispenser module 26D may apply a fourth layer of a second multi-layer device at assembly station 44D, dispenser module 26C may apply a third layer of a third multi-layer device at assembly station 44C, dispenser module 26B may be apply a second layer of a fourth multi-layer device at assembly station 44B, and dispenser module 26A may apply a first layer of a fifth multi-layer device at assembly station 44A simultaneously. The multi-layer devices (in their various states of assembly) may be advanced simultaneously by the hitch feed 30 in between assembly steps.

A production rate of the assembly system 10 depends on the types of materials used, the number of layers laminated, required positional tolerance, and ancillary operations such as vision inspections and/or tests. The assembly system 10 may have an increased production rate of between 2.5 to 4 times that of known systems. Production rates may be increased via alignment, inspection, or defect cameras placed between vacuum plates.

The assembly system 10 has improved lamination accuracy. Lamination accuracy for known systems requires a true positional tolerance of Ø 0.40 mm (Ø 0.016″). The assembly system 10 meets this capability at a process capability index $C_{pk}$ of 1.33.

The assembly system 10 may accommodate a maximum cartridge format of 100 mm by 165 mm (3.94 inches by 6.5 inches) with an achievable stacking tolerance of up to plus or minus 125 μm (plus or minus 0.005 inches), and production from 6 to 11 cartridges per minute, each based on optimized manufacturing stability and types of placement media. Special component handling, such as when membrane layers are present in the multi-layer device, may be implemented via purpose-designed transport systems that handle parts smaller than nominal format size.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A multi-layer device assembly system comprising:
   a substrate source configured to supply a substrate in a feed direction, the substrate having a plurality of bases spaced apart from each other along a length of the substrate;
   a feeder configured to mete out the substrate from the substrate source so as to advance a first base of the plurality of bases to a first assembly station;
   a first dispenser module having a first actuation mechanism configured to apply a first element onto the first base on the substrate at the first assembly station, the feeder being further configured to advance the first base from the first assembly station to a second assembly station and a second base of the plurality of bases to the first assembly station;
   a first alignment camera configured to view a cursory position of the first element to align the first actuation mechanism with the first element;
   a second alignment camera configured to view fiducial locations on the first element to determine a position of the first element relative to the first actuation mechanism;
   a third alignment camera configured to view the first element to determine a position of the first element relative to the first base;
   a second dispenser module having a second actuation mechanism configured to apply a second element onto the first element at the second assembly station so as to form a multi-layer device;
   a fourth alignment camera configured to view a cursory position of the second element to align the second actuation mechanism with the second element;

a fifth alignment camera configured to view fiducial locations on the second element to determine a position of the second element relative to the second actuation mechanism;
a sixth alignment camera configured to view the second element to determine a position of the second element relative to the first element;
a layer inspection camera configured to view the first base, the first element, and the second element to confirm placement and alignment of the first element and second element;
a defect inspection camera configured to view the first base, the first element, and the second element for detecting defects;
a thickness sensor configured to sense a height or thickness of the multi-layer device; and
a processor configured to analyze images from the alignment cameras, the layer inspection camera, and the defect inspection camera.

2. The multi-layer device assembly of claim 1, further comprising a vacuum plate configured to stabilize the first base at the first assembly station and/or the second assembly station.

3. The multi-layer device assembly of claim 1, further comprising a plurality of clamps configured to secure the substrate when the first base is at the first assembly station or the second assembly station.

4. The multi-layer device assembly of claim 1, wherein the processor includes a master computer, a secondary computer, and a plurality of alignment camera controllers, wherein each alignment camera controller is positioned on one of the dispensers and communicatively coupled with one of the alignment cameras, the master computer being configured to coordinate the alignment camera controllers.

5. The multi-layer device assembly of claim 1, wherein the layer inspection camera and the alignment cameras are high-resolution cameras having at least 21 megapixels.

6. The multi-layer device assembly of claim 1, further comprising a press configured to compress the multi-layer device at a press station.

7. The multi-layer device assembly of claim 1, wherein the feeder is one of a hitch-feed mechanism and a servo-driven vacuum conveyer.

8. The multi-layer device assembly of claim 1, further comprising a web guide actuator configured to maintain a cross-web alignment of the substrate.

9. A method of assembling a multi-layer device comprising the steps of:
supplying a substrate in a feed direction, the substrate having a plurality of bases spaced apart from each other along a length of the substrate;
meting out the substrate from a substrate source via a feeder so as to advance a first base of the plurality of bases to a first assembly station;
viewing a cursory position of a first element relative to a first actuation mechanism of a first dispenser module via a first alignment camera;
aligning the first actuation mechanism with the first element;
viewing fiducial locations on the first element via a second alignment camera;
determining a position of the first element relative to the first actuation mechanism via the fiducial locations via a processor;
applying the first element onto the first base on the substrate at the first assembly station via the first actuation mechanism;
viewing the first element via a third alignment camera;
determining a position of the first element relative to the first base via the processor;
advancing the first base from the first assembly station to a second assembly station;
advancing a second base of the plurality of bases to the first assembly station;
viewing a cursory position of a second element relative to a second actuation mechanism of a second dispenser module via a fourth alignment camera;
aligning the second actuation mechanism with the second element;
viewing fiducial locations on the second element via a fifth alignment camera;
determining a position of the second element relative to the second actuation mechanism via the fiducial locations of the second element via the processor;
applying the second element onto the first element at the second assembly station so as to form a multi-layer device;
viewing the second element via a sixth alignment camera;
determining a position of the second element relative to the first element via the processor;
viewing the first base, the first element, and the second element via a layer inspection camera to confirm placement and alignment of the first element and the second element;
viewing the first base, the first element, and the second element via a defect inspection camera to detect defects; and
sensing a height or thickness of the multi-layer device via a thickness sensor.

10. The method of claim 9, further comprising the step of stabilizing the first base at the first assembly station via a vacuum plate.

11. The method of claim 9, further comprising the step of securing the substrate when the first base is at the first assembly station or the second assembly station via a plurality of clamps.

12. The method of claim 9, further comprising the step of marking one of the first element, the second element, and the first base if a defect is detected.

13. The method of claim 9, further comprising the step of compressing the multi-layer device at a press station.

14. The method of claim 9, further comprising the step of maintaining a cross-web alignment of the substrate via a web guide actuator.

15. The method of claim 9, further comprising the step of mitigating static electricity accumulation.

16. A multi-layer device assembly system comprising:
an enclosure;
an air filtration system attached to the enclosure for filtering air passing into the enclosure;
an unwind spindle configured to supply a substrate in a feed direction, the substrate having a plurality of bases spaced apart from each other along a length of the substrate;
a feeder configured to mete out the substrate from the substrate source so as to advance a first base of the plurality of bases to a first assembly station;
a first dispenser module having a first actuation mechanism configured to apply a first element onto the first base on the substrate at the first assembly station, the feeder being further configured to advance the first base from the first assembly station to a second assembly station and a second base of the plurality of bases to the first assembly station;

a first alignment camera configured to view a cursory position of the first element to align the first actuation mechanism with the first element;
a second alignment camera configured to view fiducial locations on the first element to determine a position of the first element relative to the first actuation mechanism;
a third alignment camera configured to view the first element to determine a position of the first element relative to the first base;
a second dispenser module having a second actuation mechanism configured to apply a second element onto the first element at the second assembly station;
a fourth alignment camera configured to view a cursory position of the second element to align the second actuation mechanism with the second element;
a fifth alignment camera configured to view fiducial locations on the second element to determine a position of the second element relative to the second actuation mechanism;
a sixth alignment camera configured to view the second element to determine a position of the second element relative to the first element;
a third dispenser module having a third actuation mechanism configured to apply a third element onto the second element at a third assembly station;
a seventh alignment camera configured to view a cursory position of the third element to align the third actuation mechanism with the third element;
an eighth alignment camera configured to view fiducial locations on the third element to determine a position of the third element relative to the third actuation mechanism;
a ninth alignment camera configured to view the third element to determine a position of the third element relative to the second element;
a fourth dispenser module having a fourth actuation mechanism configured to apply a fourth element onto the third element at the fourth assembly station so as to form a multi-layer device assembly;
a tenth alignment camera configured to view a cursory position of the fourth element to align the fourth actuation mechanism with the fourth element;
an eleventh alignment camera configured to view fiducial locations on the fourth element to determine a position of the fourth element relative to the fourth actuation mechanism;
a twelfth alignment camera configured to view the fourth element to determine a position of the fourth element relative to the third element;
a plurality of clamps configured to secure the substrate when the first base is at one of the assembly stations;
a web guide actuator configured to maintain a cross-web alignment of the substrate;
a vacuum plate configured to stabilize the first base at one of the assembly stations;
a press configured to compress the multi-layer device assembly at a press station;
a layer inspection camera configured to view the first base, the first element, the second element, the third element, and the fourth element to confirm placement and alignment of the first element, the second element, the third element, and the fourth element;
a defect inspection camera configured to view the first base, the first element, the second element, the third element, and the fourth element for detecting defects;
a thickness sensor configured to sense a height or thickness of the multi-layer device; and
a processor configured to analyze images from the alignment cameras, the layer inspection camera, and the defect inspection camera.

* * * * *